United States Patent
Gattami et al.

(10) Patent No.: US 10,432,383 B2
(45) Date of Patent: Oct. 1, 2019

(54) METHOD FOR ENABLING A BASE STATION TO DECODE DATA RECEIVED FROM A FIRST WIRELESS DEVICE USING A NETWORK CODED FORM OF THE DATA RECEIVED FROM A SECOND WIRELESS DEVICE

(71) Applicant: Telefonaktiebolaget LM Ericsson (Publ), Stockholm (SE)

(72) Inventors: Ather Gattami, Stockholm (SE); Gabor Fodor, Hässelby (SE); Aidilla Pradini, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 311 days.

(21) Appl. No.: 15/104,049

(22) PCT Filed: Dec. 30, 2013

(86) PCT No.: PCT/SE2013/051629
§ 371 (c)(1),
(2) Date: Jun. 13, 2016

(87) PCT Pub. No.: WO2015/102523
PCT Pub. Date: Jul. 9, 2015

(65) Prior Publication Data
US 2017/0027010 A1    Jan. 26, 2017

(51) Int. Cl.
*H04L 5/00*     (2006.01)
*H04W 24/08*    (2009.01)
(Continued)

(52) U.S. Cl.
CPC .............. *H04L 5/006* (2013.01); *H04L 1/20* (2013.01); *H04L 43/16* (2013.01); *H04W 24/08* (2013.01);
(Continued)

(58) Field of Classification Search
CPC ............ C12Q 1/6895; C12Q 2600/158; H04B 7/15521; H04L 1/20; H04L 2001/0097;
(Continued)

(56) References Cited

U.S. PATENT DOCUMENTS

2007/0274241 A1    11/2007  Brothers
2008/0165880 A1    7/2008   Hyon et al.
(Continued)

FOREIGN PATENT DOCUMENTS

EP    2383924 A1      11/2011
WO    2010006649 A1   1/2010
WO    2 383 924 A1    11/2011

OTHER PUBLICATIONS

Project No. Celtic/CP5-026; Project Title: Wireless World Initiative New Radio—WINNER+; ID D1.3; Title: Innovative concepts in Peer-to-Peer and Network Coding; Author: Klaus Doppler, Jawad Manssour, Afif Osseiran, Ming Xiao; Date Last changes: Jan. 16, 2009.*

(Continued)

*Primary Examiner* — Huy D Vu
*Assistant Examiner* — Nizam U Ahmed
(74) *Attorney, Agent, or Firm* — Patent Portfolio Builders, PLLC

(57) ABSTRACT

A method and a base station are provided. The base station obtains a first path gain of a cellular radio link to a first wireless device, a second path gain of a cellular radio link to a second wireless device and a third path gain of a Device-to-Device radio link between the first wireless device and the second wireless device. When the first, second and third path gains satisfy a threshold condition, the base station instructs the second wireless device to apply network coding on first data transmitted from the first wireless device and to transmit a network coded form of the (Continued)

first data. The base station receives a radio signal with the first data transmitted from the first wireless device and uses the network coded form of the first data transmitted by the second wireless device for decoding the first data.

16 Claims, 6 Drawing Sheets

(51) Int. Cl.

| | | |
|---|---|---|
| *H04L 1/00* | (2006.01) | |
| *H04L 1/20* | (2006.01) | |
| *H04L 12/26* | (2006.01) | |
| *H04W 52/36* | (2009.01) | |
| *H04W 76/14* | (2018.01) | |
| *H04B 7/155* | (2006.01) | |

(52) U.S. Cl.
CPC ......... *H04W 52/367* (2013.01); *H04W 76/14* (2018.02); *H04B 7/15521* (2013.01); *H04L 2001/0097* (2013.01)

(58) Field of Classification Search
CPC ........ H04L 43/16; H04L 5/006; H04W 24/08; H04W 52/367; H04W 76/023; H04W 76/14
USPC .......................................................... 370/329
See application file for complete search history.

(56) References Cited

U.S. PATENT DOCUMENTS

| | | | |
|---|---|---|---|
| 2010/0261469 A1 | 10/2010 | Ribeiro et al. | |
| 2011/0212684 A1 | 9/2011 | Nam et al. | |
| 2013/0229975 A1* | 9/2013 | Zainaldin | H04B 7/15521 370/315 |
| 2013/0308490 A1 | 11/2013 | Lim et al. | |
| 2014/0071950 A1* | 3/2014 | Jang | H04W 36/30 370/331 |
| 2014/0213221 A1* | 7/2014 | Chai | H04W 72/0493 455/411 |

OTHER PUBLICATIONS

International Search Report and Written Opinion dated Oct. 13, 2014 for International Application Serial No. PCT/SE2013/051629, International Filing Date—Dec. 30, 2013 consisting of 8-pages.
Rudolf Ahlswede, et al.—Title: "Network Information Flow", Published in: IEEE Transactions on Information Theory, vol. 46(4):1204-1216 Jul. 2000 consisting of 13-pages.
Klaus Doppler, et al., "Device-to-Device Communication as an Underlay to LTE-Advanced Networks", IEEE Communications Magazine, vol. 47(12):42-49, Dec. 11, 2009 consisting of 8-pages.
Gábor Fodor et al.: "Design Aspects of Network Assisted Device-to-Device Communications", IEEE Communications Magazine, vol. 50(3):170-177, Mar. 5, 2012 consisting of 8-pages.
3GPP TSG-RAN WG1 #75, San Francisco, CA (USA) R1-135207, Agenda Item: 6.2.5, Source: Samsung Title: "Discussion on Measurements for Further MBMS Operations Support" Document for: Discussion and Decision Nov. 11-15, 2013 consisting of pp. 4-pages.
Klaus Doppler, et al, Project No. CELTIC / CP5-026, Project Title: "Wireless World Initiative New Radio—WINNER+, Document Type: P (Public) Document Identifier: D1.3, Document Title: Innovative concepts in Peer-to-Peer and Network Coding", Source Activity: WP1, Editor: Klaus Doppler, Ming Xiao, Status / Version: Final / 1.0. Date Last changes: Jan. 16, 2009, File Name: D1.3.doc consisting of 26-pages.
Supplementary European Search Report dated Jul. 24, 2017 for European Application No. EP13900841, International Filing date Dec. 30, 2013, consisting of 3-pages.
Marcin Rodziewicz, Title: "Network Coding Aided Device-to-Device Communication", ISBN 978-3-8008-3426-9, VDE Verlag GMBH, European Wireless 2012, Apr. 18-20, 2012, Poznan, Poland, consisting of 5-pages.
3GPP TSG-RAN WG1 #15, San Francisco, CA (USA) R1-135207, Agenda Item: 6.2.5, Source: Samsung Title: "Discussion on Measurements for Further MBMS Operations Support" Document for: Discussion and Decision Nov. 11-15, 2013 consisting of pp. 4-pages.
Gábor Fodor et al., "Design Aspects of Network Assisted Device-to-Device Communications", Communications Magazine, (Mar. 2012), XP055059107 [A].
Office Action issued in Australian application No. 2013409521, dated Dec. 15, 2016; 2 pages.

* cited by examiner

| G12 | G1 | G2 | Mode |
|---|---|---|---|
| < TH1 | -- | -- | 1. (Cellular only) |
| -- | -- | < TH2 | 2. (Cellular only) |
| -- | > TH3 | -- | 3. (Cellular only) |
| > TH1 | < TH3<br>< TH4 | > TH2 | 4. (NWC only) |
| > TH1 | < TH3<br>> TH4 | > TH2 | 5. (Cellular + NWC) |
Fig. 7
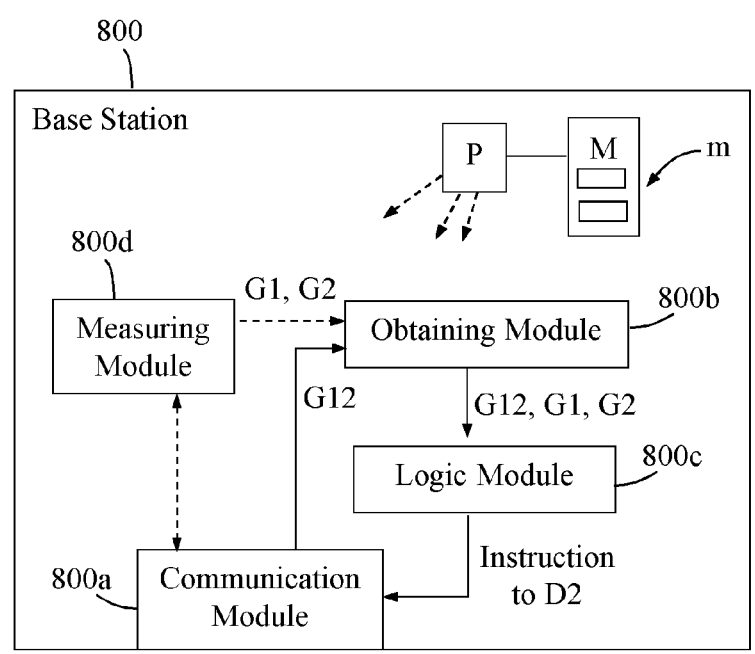
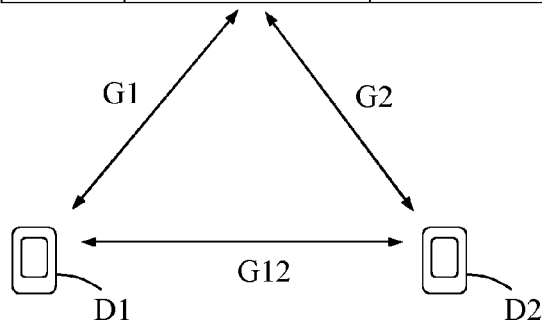
Fig. 8

METHOD FOR ENABLING A BASE STATION TO DECODE DATA RECEIVED FROM A FIRST WIRELESS DEVICE USING A NETWORK CODED FORM OF THE DATA RECEIVED FROM A SECOND WIRELESS DEVICE

TECHNICAL FIELD

The present disclosure relates generally to a method and a base station of a radio network, for supporting cellular communication over a D2D radio link between the base station and a first wireless device.

BACKGROUND

When two wireless devices communicate with each other in a cellular radio network in a traditional manner, each wireless device communicates radio signals with a serving base station of the radio network by sending uplink radio signals to the base station as well as receiving downlink radio signals from the base station. This is the traditional way of communication in a radio network also when the two wireless devices are located somewhat close to one another and being served by the same base station. Recently, techniques have been developed to enable such wireless devices in a radio network to communicate radio signals with each other directly, as controlled by the radio network and using frequency spectrum licensed to the network, such that each wireless device receives and decodes the actual radio signals that are transmitted from the opposite, or "peer", wireless device. Bluetooth is another example of direct communication between wireless devices, although without control or involvement by any network.

Communication of radio signals may thus take place directly between the two wireless devices without the radio signals being communicated over the radio network via one or more base stations. In that case, the serving base station allocates radio resources, e.g. defined by time and/or frequency, which the wireless devices are allowed to use in the direct communication. Such direct radio communication between two wireless devices is commonly referred to as "Device-to-Device, D2D, communication" which term will be used throughout this disclosure.

In the field of cellular radio technology, the term "wireless device" is usually used and will be used in this disclosure to represent any wireless communication entity capable of radio communication with a cellular radio network including receiving and sending radio signals. Another common term in this field is "User Equipment, UE" which implies that the communication entity can be carried and operated by a human user, examples include mobile telephones, tablets and laptop computers. However, a wireless device in this context is not necessarily operated by a human user. It could also be a machine-to-machine type of device operating automatically such as a sensor, counter or measuring entity.

Further, the term "base station", sometimes also referred to as a network node, radio node, e-NodeB, eNB, NB, base transceiver station, etc., represents any node of a cellular radio network that is arranged to communicate radio signals with wireless devices. The base station described here may, without limitation, be a so-called macro base station or a low power base station such as a micro, pico, femto, Wifi or relay node, to mention some customary examples. Throughout this disclosure, the terms "network node" and "User Equipment, UE" can further be used instead of base station and wireless device, respectively.

The above D2D communication may thus be employed whenever the two wireless devices, also referred to as "peer devices" or just "peers", are close enough to one another to be able to receive and decode direct radio signals from the opposite peer. Thereby, it may be possible to reduce transmit power in the area and also to reduce interference, as compared to what is required to enable a serving base station to communicate radio signals with the wireless devices in the traditional manner.

In a conventional cellular communication between a base station and a wireless device, a radio signal transmitted by the wireless device may be successfully received and decoded by the base station provided that the current radio conditions allow for sufficient quality of the received signals such that e.g. a received Signal to Interference and Noise Ratio (SINR) exceeds a minimum required threshold or similar. This means that the received signal should not be too weak and/or interfered too much by other radio transmissions in the neighborhood for satisfactory reception and decoding. For example, the wireless device may be situated close to the cell edge and relatively far from the base station, or in a spot with bad radio coverage, so that the radio signal fades considerably on its way to the base station. Furthermore, the wireless device may in that case need to transmit with increased power in order to provide a sufficiently strong signal at the receiving base station, which may cause interference to other nearby communications. Another possibility is to add extra bits which can be used to assist the decoding in the base station's receiver although they occupy precious radio resources such that overall data throughput is reduced.

It is thus a problem to maintain a good enough signal quality over a cellular radio link for certain wireless devices without causing too much interference and/or reduction of data throughput, particularly under less than optimal radio conditions.

SUMMARY

It is an object of embodiments described herein to address at least some of the problems and issues outlined above. It is possible to achieve this object and others by using a method and a base station as defined in the attached independent claims.

According to one aspect, a method is provided in a base station of a radio network, for supporting communication over a cellular radio link between the base station and a first wireless device. In this method, the base station obtains a first path gain of a cellular radio link between the base station and the first wireless device, and also obtains a second path gain of a cellular radio link between the base station and a second wireless device. The base station also obtains a third path gain of a Device-to-Device, D2D radio link between the first wireless device and the second wireless device.

When the first, second and third path gains satisfy a threshold condition, the base station further instructs the second wireless device to apply network coding on first data transmitted from the first wireless device and to transmit a network coded form of the first data. The base station is then able to use the network coded form of the first data transmitted by the second wireless device for decoding the first data. Thereby, it is an advantage that the decoding the first data is more likely to succeed as compared to not using the network coded form of the first data.

According to another aspect, a base station of a radio network is arranged to support communication over a cellular radio link between the base station and a first wireless device. The base station comprises at least a communication module with radio circuitry for conducting radio communication with the first wireless device and a second wireless device. The base station is configured to obtain a first path gain of a cellular radio link between the base station and the first wireless device, obtain a second path gain of a cellular radio link between the base station and a second wireless device, and to obtain a third path gain of a Device-to-Device, D2D radio link between the first wireless device and the second wireless device.

When the first, second and third path gains satisfy a threshold condition, the base station is configured to instruct the second wireless device to apply network coding on first data transmitted from the first wireless device and further instruct the second wireless device to transmit a network coded form of the first data. The base station is further configured to receive a radio signal with the first data transmitted from the first wireless device, and to use the network coded form of the first data transmitted by the second wireless device for decoding the first data.

The above method and base station may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which:

FIG. 7 is a table for mode selection which may be used when implementing the solution, according to further possible embodiments.

FIG. 8 is a block diagram illustrating a base station in more detail, according to further possible embodiments.

DETAILED DESCRIPTION

A solution is provided to enable a base station to successfully decode a received radio signal transmitted from a first wireless device even when the received radio signal may be too weak and/or interfered for being successfully decoded as such by the base station. The solution relies on assistance provided by a second wireless device that employs a D2D communication with the first wireless device, as follows.

Figure 1:
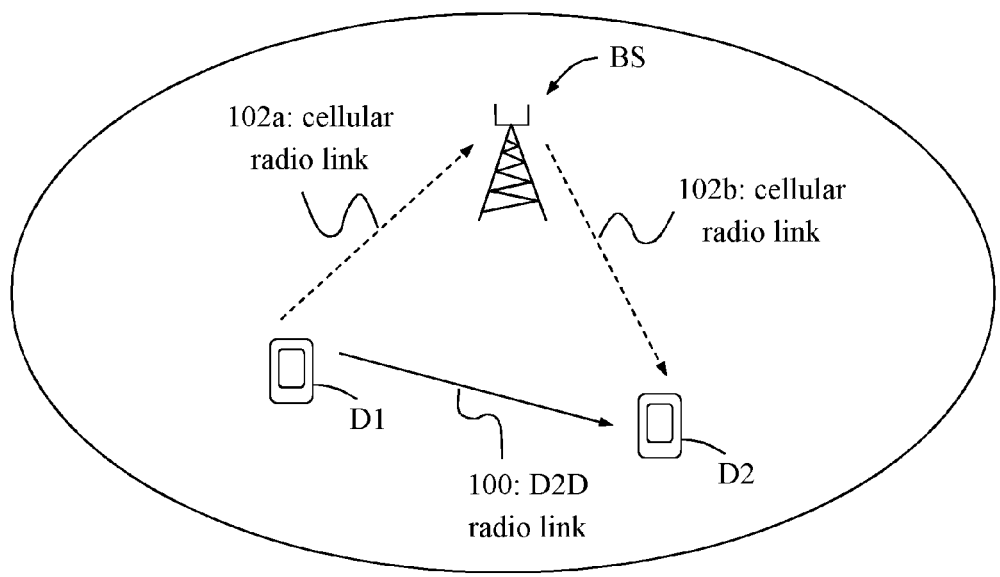
FIG. 1 illustrates a communication scenario with radio links for D2D communication and for cellular communication, according to the prior art.

When the quality of a D2D radio link is not sufficient to enable successful reception and decoding for a D2D communication as such, it is known in the art that so-called network assisted D2D communication may be employed where the base station BS applies Network Coding, referred to as NWC, on data that is transmitted in a radio signal between two devices D1, D2. In this mode of operation, with reference to the scenario shown in FIG. 1, the base station BS receives data e.g. from device D1 on a cellular radio link 102a and transmits the data in network coded form to device D2 on another cellular radio link 102b, thereby enabling the receiving wireless device D2 to use the network coded form of the data for decoding the radio signal from device D1.

In this solution, it is proposed to use a similar technique with NWC on data that is transmitted from a first device to the base station, by instructing a second wireless device to apply NWC on the data and to transmit the data in network coded form when a certain threshold condition is fulfilled involving various path gains of radio links between the two devices and the base station. In that case, the base station is able to use the data in network coded form transmitted by the second wireless device for decoding the radio signal transmitted from the first device. The term "Network Coding", NWC, will be used in the following description which indicates a technique normally used by a network node such as the base station according to known procedures, even though it is actually the second wireless device that applies NWC and transmits the data in network coded form in embodiments to be described herein.

An example of how NWC may be applied in practice to assist or support a cellular communication between a first wireless device D1 and a base station BS with help from a second wireless device D2, will now be described with reference to FIG. 2a which may be used for this solution. The first wireless device D1 sends data "x1" in a first radio signal to the base station BS, and likewise the base station BS sends data "x2" in a second radio signal to the first wireless device D1, as indicated by arrows between the device D1 and base station BS. Assuming that a D2D communication has been established between devices D1 and D2, the data x1 and x2 are both also received by the second wireless device D2, as indicated by respective arrows from device D1 and base station BS to the second wireless device D2.

In this solution, the base station BS has instructed the second wireless device D2 to apply NWC on the data x1 and x2, provided that a threshold condition is satisfied which will be described later below, to enable base station BS and device D1 to decode the received radio signals with sufficient accuracy and reliability by means of the applied NWC. The second wireless device D2 accordingly applies a network coding function "F" on the data x1 and x2 and sends a network coded form of the first and second data, denoted F(x1,x2), to both base station BS and wireless device D1, as indicated by dashed arrows from device D2 to base station BS and wireless device D1. Thereby, the base station BS is able to use the network coded form of the first and second data F(x1,x2) for decoding the first radio signal x1, and likewise the first wireless device D1 is able to use the network coded form of the first and second data F(x1,x2) for decoding the second radio signal x2. An example of how this could be done will be described in more detail later below.

Figure 2A:
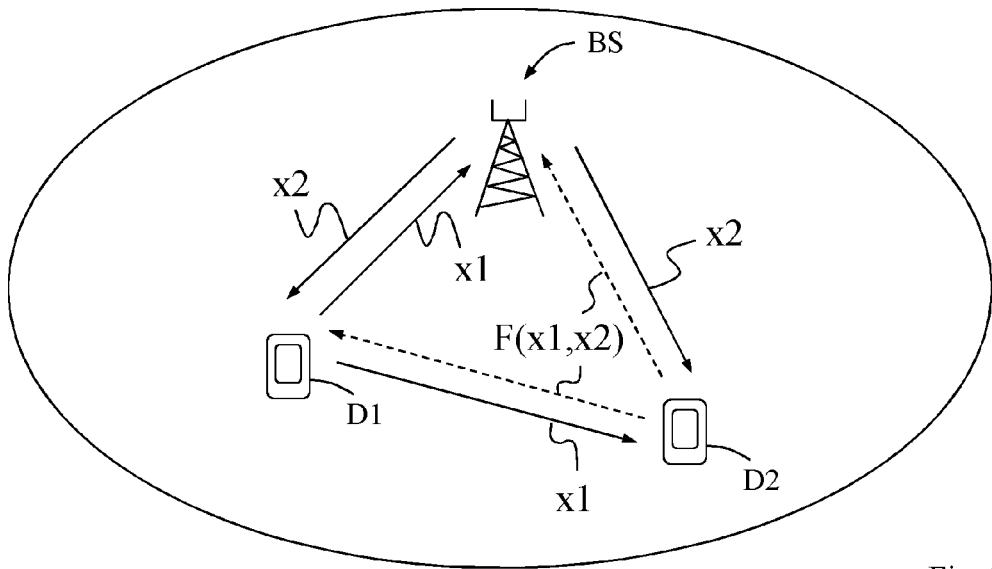
FIGS. 2a and 2b illustrate a D2D communication supported by network coding, which can be used in embodiments herein.
Figure 2B:
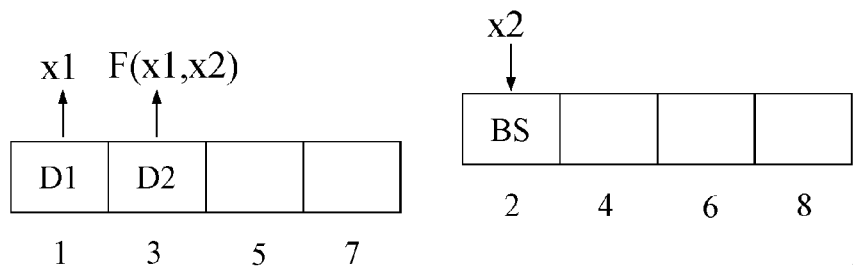

FIG. 2b illustrates an example of how the above data may be transmitted in different timeslots according to a Time Division Duplex, TDD, transmission scheme, although it is possible to employ the described communication assisted with NWC for other transmission schemes as well. The example TDD scheme in FIG. 2b comprises a set of timeslots 1, 3, 5 and 7 dedicated for uplink transmissions and another set of timeslots 2, 4, 6 and 8 dedicated for downlink transmissions. It should be noted that the uplink timeslots are intertwined in time, i.e. take turns according to the numbering, with the downlink timeslots in this non-limiting example. In brief, the data x1 is transmitted from device D1 in timeslot 1, the data x2 is transmitted from the base station BS in timeslot 2, and the network coded form F(x1,x2) is transmitted from device D2 in timeslot 3. The above procedure may be described in more detail with reference to FIGS. 2a and 2b in the following manner:

A. The wireless device D1 sends data x1 in TDD timeslot 1, which data is received by the base station BS using existing technology. For this purpose, the base station BS may use known techniques to schedule an uplink transmission for the data x1. Parallel with this transmission and using the same radio resource of TDD timeslot 1, the same data x1 is also sent to and received by the second wireless device D2. To achieve this, the base station BS configures the device D2 for the reception of data x1 as part of a D2D bearer setup procedure. When device D1 sends data x1 to the base station BS and its peer device D2, device D1 also stores its own transmitted data x1.

B. Upon reception and decoding of the data x1, the base station BS and device D2 both store x1 for subsequent processing. To enable this, device D2 has been configured by the base station BS to store the data x1.

C. In the following downlink TDD slot 2, the base station BS sends its data x2 to the device D1 and to device D2 in a similar manner. It is assumed that device D1 has been instructed by the base station BS to await, decode and store the data x2 in TDD slot 2 following its own transmission in TDD slot 1 of data x1 to the device D2 and the base station BS.

D. Once the second wireless device D2 has received x1 and x2, it employs an operation in the form of function F(.,.) on x1 and x2, which operation may be linear. For example F(x1,x2) may be a simple XoR operation or it may involve other operations on x1 and x2.

E. In the subsequent uplink TDD timeslot 3 in this example, the base station BS schedules an uplink transmission from device D2 to both device D1 and base station BS and device D2 accordingly transmits the network coded data F(x1,x2) to device D1 and to base station BS simultaneously.

F. Upon reception of the network coded data F(x1,x2) from device D2, the base station BS performs a so called "combining" operation on the data x1 and the network coded data F(x1,x2) to decode the data x1, to be described below. The device D1 performs a similar operation.

Briefly described, this combining operation or similar enables the base station BS to decode the received data correctly, i.e. with improved accuracy, which may not be possible to do on the data x1 received directly from D1 alone due to insufficient signal quality. The same may also apply to the data x2 received by device D1. Furthermore, it may be possible to reduce transmit power from the device D1, and correspondingly from the base station BS, and still achieve satisfactory reception and decoding thanks to the NWC, which in turn may further result in reduced interference in the area.

It was mentioned above that in this solution the operation mode of cellular communication supported by NWC is applied when a threshold condition is satisfied, the threshold condition involving various path gains including path gains "G1" and "G2" of cellular radio links between the base station and the respective wireless devices D1, D2 and a path gain "G12" of a D2D radio link between the two devices D1 and D2. These three path gains G1, G2 and G12 are indicated in FIG. 3.

An example of a procedure with actions, performed by a base station of a radio network, to support a cellular communication over a cellular radio link between the base station and a first wireless device D1, will now be described with reference to the flow chart in FIG. 4 and also to FIG. 3, the base station being denoted 300. This procedure thus illustrates how the base station can instruct the second wireless device D2 to apply NWC in a D2D communication to support the cellular communication under certain circumstances when the benefits of lower transmit power and reduced interference may be achieved depending on the above path gains. The base station is thus arranged or configured to perform the actions of the flow chart in FIG. 4.

Figure 3:
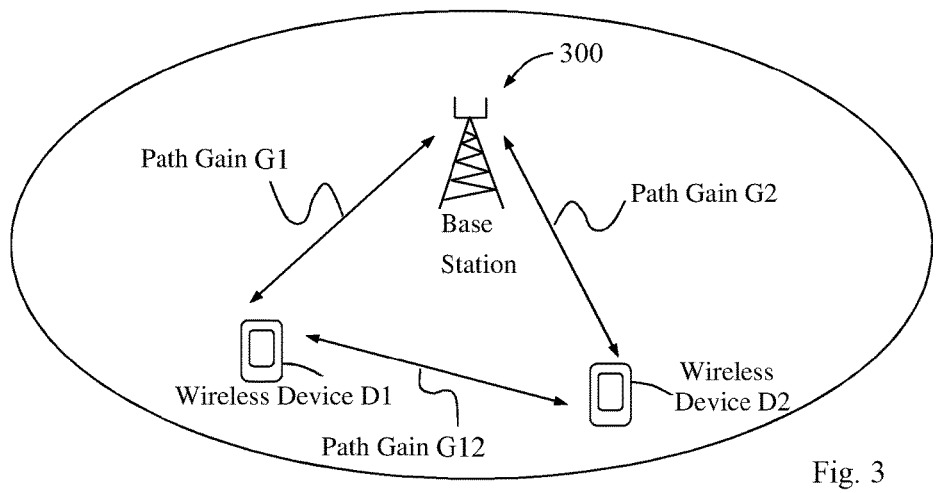
FIG. 3 illustrates path gains of various radio links, which can be used according to some possible embodiments.

A first action 400 illustrates that the base station 300 obtains a first path gain of the cellular radio link between the base station and a first wireless device D1, i.e. the path gain G1 in FIG. 3. Another action 402 illustrates that the base station 300 further obtains a second path gain of a cellular radio link between the base station and the second wireless device D2, i.e. the second path gain G2 in FIG. 3. The base station 300 also obtains, in another action 404, a third path gain of a D2D radio link between the first and second wireless devices D1, D2, i.e. the path gain G12 in FIG. 3. In this disclosure, either of the path gains G1 and G2 may also be denoted $G^{UE-BS}$, and the third path gain G12 may also be denoted $G^{D2D}$.

In a possible embodiment, the third path gain G12 of the D2D radio link may be obtained from measurements of the D2D radio link reported by at least one of the first and second wireless devices D1, D2. For example, device D1 and/or D2 may measure a link quality, e.g. in terms of path loss, of the D2D radio link based on signals received from the opposite peer, using any existing measurement technique, and report the measured link quality to the base station 300. The first path gain may be obtained by computing an average of the link quality measured and reported by device D1 and by device D2, respectively.

In another possible embodiment, the first and second path gains G1 and G2 may be obtained from measurements of the respective cellular radio links between the base station and the first and second wireless devices D1, D2. For example, at least some of the measurements in this embodiment may be measurements of path loss which may be made by the base station and/or by the respective device D1, D2, e.g. according to known procedures. In the latter case, devices D1, D2 will need to report their path loss measurements to the base station 300.

Another action 406 illustrates that the base station 300 evaluates a threshold condition and determines whether the above-obtained first, second and third path gains satisfy the threshold condition or not. If they satisfy the threshold condition, the base station 300 decides to utilize the second device D2 to provide NWC which can be used for decoding data from the first wireless device D1. To accomplish this, the base station 300 instructs the second wireless device D2 to apply network coding on first data x1 transmitted from the first wireless device D1 and to transmit a network coded form of the first data x1, as illustrated by an action 408. Thus, it is assumed that the threshold condition has been defined such that the above-described benefits of reduced transmit power to or from the devices may be achieved in conjunction with adequate decoding of received radio signals by applying a communication mode with NWC assisted by the second device D2. As a result, the benefits of using lower transmit power means that power consumption is reduced in the respective device and that interference also may be reduced in the cell served by the base station and possibly also in one or more neighboring cells.

Another action 410 illustrates that the base station 300 receives a signal with the first data x1 from the first device D1. The base station 300 then uses the network coded form of the first data transmitted by the second wireless device D2 for decoding the first data x1, in a final shown action 412. On the other hand, if it is determined in action 406 that the first, second and third path gains do not satisfy the threshold condition, a purely cellular mode of operation is applied in another action 414.

In some possible embodiments, the threshold condition may more specifically dictate that:
- the third path gain G12 is above a first predefined threshold which may be denoted "TH1",
- the second path gain G2 is above a second predefined threshold which may be denoted "TH2", and
- the first path gain G1 is below a third predefined threshold which may be denoted "TH3".

Thereby, the threshold condition requires that the third path gain G12 of the link between devices D1 and D2 is strong enough, i.e. higher than the first threshold TH1, and that the second path gain G2 of the link between base station 300 and device D2 is strong enough, i.e. higher than the second threshold TH2, and also that the first path gain G1 of the link between base station 300 and device D1 is weak enough, i.e. lower than the third threshold TH3, in order to enable beneficial usage of NWC assisted by the second device D2.

When the threshold condition is satisfied in action 406, one of the following two alternatives may be applied depending on a fourth predefined threshold which may be denoted "TH4", as follows. Thus in some further possible embodiments, the base station may use one of:
- only the network coded form of the first data transmitted by the second wireless device D2 for decoding the first data x1 when the first path gain G1 is below the fourth predefined threshold TH4 which is lower than the third predefined threshold TH3, and
- both the network coded form of the first data transmitted by the second wireless device D2 and a received radio signal with the first data x1 transmitted from the first wireless device D1 in a combining operation for decoding the first data x1 when the first path gain G1 is above the fourth predefined threshold TH4.

Thus in the first alternative above, it is assumed that only the network coded form from D2 and not the direct radio signal from D1 is useful for decoding the data x1 when the first path gain G1 of the link between base station 300 and device D1 is lower than both the third threshold TH3 and the fourth threshold TH4. In the second alternative above, on the other hand, it is assumed that both the network coded form and the direct radio signal from D1 may be useful to the base station for decoding the data x1 when the first path gain G1 of the link between base station 300 and device D1 is lower than the third threshold TH3 but higher than the fourth threshold TH4.

In another possible embodiment, the base station 300 may apply the cellular communication mode assisted by NWC in the manner described above for FIGS. 2a, 2b. Thus, the base station 300 may further instruct the second wireless device D2 to apply network coding on the first data x1 transmitted from the first wireless device D1 and on second data x2 transmitted from the base station, and to transmit a network coded form of the first and second data x1, x2. In that case, the base station 300 is able to use the network coded form of the first and second data x1, x2 transmitted by the second wireless device D2 for decoding the first data x1.

The base station 300 and the first device D1 may decode the received data x2 and x1, respectively, aided by the network coded form F(x1,x2) by performing a combining operation which is known as such. In a possible embodiment, the base station 300 may signal to the second wireless device D2 a network coding function used for creating the network coded form of the first and second data F(x1,x2). An example of how this combining operation might be executed by a wireless device will be briefly outlined with reference to FIG. 9 later below.

It was mentioned above that the threshold condition should be defined such that the benefits of reduced transmit power to or from the base station and/or devices D1 and D2 may be achieved in conjunction with adequate decoding of received radio signals by utilizing the second device D2 to transmit the network coded form of the first data x1. It will now be described an example of how this transmit power may be set for one or both of the devices D1 and D2. Thus in a possible embodiment, the base station may set a transmit power $P^{UE,NWC}$ of at least one of the first and second wireless devices according to the following formula:

$$P^{UE,NWC} = \min[P_{MAX}, \max[A,B]]$$

where $$A = P_0^{cell} - \alpha^{cell} \cdot G^{UE-BS} + 10 \cdot \log_{10} M^{cell},$$

$$B = P_0^{D2D} - \alpha^{D2D} \cdot G^{D2D} + 10 \cdot \log_{10} M^{D2D},$$

$P_{MAX}$ is a maximum allowed transmit power,
$P_0^{cell}$ is a base power level to control cellular Signal to Noise Ratio, SNR,
$\alpha^{cell}$ is a path loss compensation factor applied on the respective cellular radio link,
$G^{UE-BS}$ is the path gain of the respective cellular radio link,
$M^{cell}$ is a number of scheduled Physical Resource Blocks, PRBs, on the respective cellular radio link,
$P_0^{D2D}$ is a base power level to control D2D SNR,
$\alpha^{D2D}$ is a path loss compensation factor applied on the D2D radio link,
$G^{D2D}$ is the path gain of the D2D radio link, and
$M^{D2D}$ is a number of scheduled PRBs on the D2D radio link.

Figure 5:
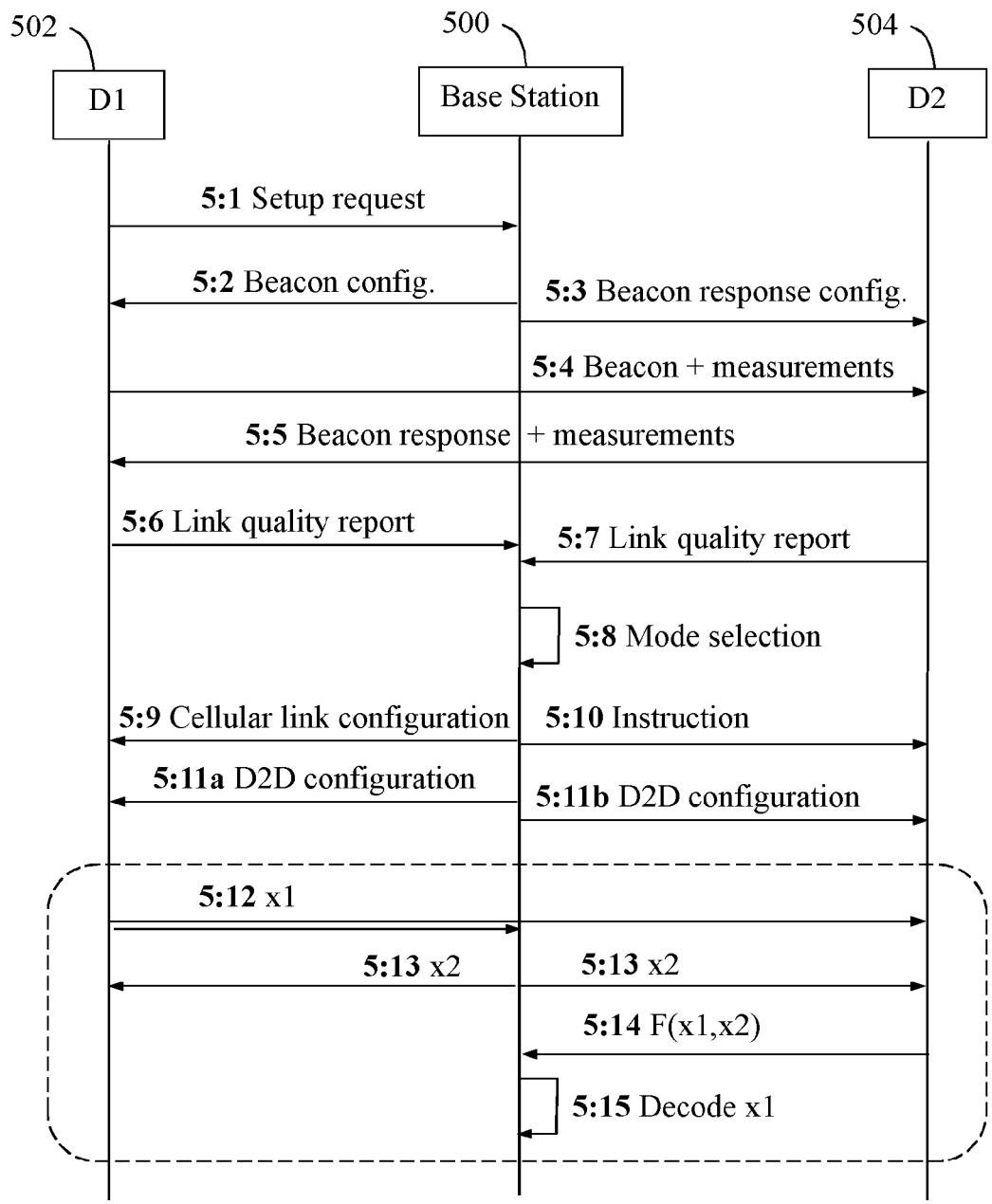
FIG. 5 is a signalling diagram illustrating an example of a procedure to set up a cellular communication when the solution is used, according to further possible embodiments.

FIG. 5 illustrates an example of a signalling procedure that may be used for establishing a cellular communication mode assisted by NWC involving two wireless devices 502 and 504 which correspond to the above first and second wireless devices D1 and D2, respectively, as controlled and implemented by a base station denoted 500 in this figure. In this example, the first device will communicate with the second device although the first device may alternatively communicate with another entity than device D2 by means of a first cellular radio link with the base station 500 where this procedure may also be used in a similar manner. In either case, this procedure is performed to support the exchange of data between device D1 and the base station 500 when the first cellular radio link between them is deemed insufficient as such, i.e. alone, for successful reception and decoding of the data. The second wireless device D2 is connected to the base station 500 by a second cellular radio link.

The procedure starts in this example when the first device D1, or 502, sends a setup request message to the base station 500 for a communication with device D2, or 504, as shown by a first action 5:1. In this setup request message, device D1 may inform the base station 500 about its own capabilities, including NWC related capabilities. Device D1 may also include information in the message about specific services it requires or offers. In the setup request message, device D1 may further indicate the specific device D2 with which the communication is to be established. The base station 500 may have received a similar setup request message from device D2, not shown.

Further, the base station 500 configures beacon signaling messages that device D1 and device D2, respectively, should use during a so-called network assisted peer discovery phase, by sending a configuration message to each device in action 5:2 and action 5:3. In this configuration message, the base station 500 may instruct the wireless devices what radio resources in time-frequency they should use when transmitting their beacon signals and what information they should include in the beacons. In networks employing Long Term Evolution, LTE, radio resources are specified as Physical Resource Blocks, PRBs. For example, the base station 500 may inform or instruct the wireless devices D1, D2 about which NWC functions they need to support to enable an operation mode which involves a D2D communication and usage of NWC. A straightforward function could be any linear combination of the broadcasted messages, for instance $F(x1,x2)$ as described above.

Next, device D1 and device D2 use the configuration data as instructed by the base station 500 when they broadcast their beacons. Thus, an action 5:4 illustrates that device D1 transmits its beacon indicating that it is "NWC enabled". This allows device D2 to reply to device D1, in a so-called "page back signal" or "beacon response signal" in action 5:5, and indicate if their NWC capabilities match, i.e. by being likewise NWC enabled. This allows the base station 500 to consider an operation mode involving a D2D communication and usage of NWC as a potential option when performing mode selection later.

Once the wireless devices D1 and D2 have detected each other, they both send a link quality report to the base station 500, which is illustrated by an action 5:6 and an action 5:7, respectively. The link quality report thus indicates quality of the D2D link and may also indicate quality of the respective first and second cellular radio links between the base station and the devices D1 and D2, which link quality reports are useful as input to the mode selection decision to be made by the base station 500. In the link quality report, device D1 and device D2 may also include information indicating whether they support a common NWC function F(.,.).

Another action 5:8 illustrates that the base station 500 makes a decision of which operation mode to apply, which decision is based on the link quality reports received in actions 5:6 and 5:7, and further on measurements made by the base station 500 on the respective cellular radio links between the base station and the first and second wireless devices. The base station 500 makes the mode selection decision based on the link quality measurements and reports as well as current resource usage and possibly other factors. In this example, the base station 500 may consider the following criteria, also discussed above, which may be necessary for selecting an operation mode which involves a D2D communication and NWC performed by the second device D2:

The third path gain of the D2D radio link between device D1 or 502 and device D2 or 504 is above the above-mentioned first predefined threshold TH1;

The second path gain of the second cellular radio link between the base station 500 and the second device D2 is above the above-mentioned second predefined threshold TH2;

The first path gain of the first cellular radio link between the base station 500 and the first device D1 is below the above-mentioned third predefined threshold TH3;

The transmit powers of device D1, device D2, and the base station 500 need not be more than a certain limit;

A sufficient bandwidth is accessible to device D1 and device D2; and

The network coding function $F(x1,x2)$ can be used by both devices D1, D2.

In this example, the base station 500 decides to employ a cellular communication with device D1 assisted by NWC performed by device D2. As a result, action 5:9 and action 5:10 illustrate that the base station 500 configures the cellular link with D1 and instructs device D2 to apply NWC in the manner described above, respectively, according to the mode selection decision in the foregoing action 5:8. Further actions 5:11a and 5:11b illustrate that the base station 500 also sends D2D link configuration messages to the respective devices D1 and D2 in order to establish the D2D communication between D1 and D2.

Now follows the actual communication of data from the first wireless device D1 to the base station 500. Another action 5:12 indicates that the first wireless device D1 transmits its data x1 which is received by both the base station 500 over the first cellular link and by the second wireless device D2 over the D2D link. Another action 5:13 indicates that the base station 500 transmits its data x2 which is received by both the first wireless device D1 over the first cellular link and by the second wireless device D2 over the second cellular link. The second wireless device D2 then applies network coding on the received first data x1 and also on the received second data x2 that has been transmitted by the base station, and transmits that data x1 and x2 in network coded form $F(x1,x2)$ to the base station 500 over the second cellular radio link in an action 5:14. A final action 5:15 illustrates that the base station 500 decodes the first data by performing a combining operation on the data x1 received directly from device D1, the data x2 transmitted by base station 500 and the network coded form $F(x1,x2)$ of the data received from device D2. In a similar manner, the device D1 is able to decode data from the base station 500 by utilizing a network coded form of the data from device D2 in a combining operation.

A more detailed procedure with actions performed by a base station, of how the above-described threshold condition may be evaluated based on the above-described first, second, third and fourth predefined thresholds, will now be described with reference to the flow chart in FIG. 6. This evaluation procedure is performed also according to a table for mode selection shown in FIG. 7, to which reference will be made as well in the description below. FIG. 7 thus illustrates the threshold requirements of the three path gains G1, G2 and G12 for applying different operation modes according to different cases 1-5 where cases 1-3 dictate pure cellular modes, case 4 dictates NWC mode only and case 5 dictates cellular mode assisted by NWC.

In a first action 600, the base station obtains a first path gain G1 of a cellular radio link between a first wireless device and the base station. Some examples of how this action may be performed have been described above. The base station proceeds to obtain a second path gain G2 of a cellular radio link between the base station and the second wireless device, in an action 602. The base station further obtains a third path gain G12 of a D2D radio link between the first wireless device and the second wireless device, in another action 604. It should be noted that it is not necessary to obtain the first, second and third path gains in the sequence order shown in this example, but they could rather be obtained in any order depending on implementation. The first, second and third path gains are used for evaluating a threshold condition as follows.

The base station checks in an action 606 whether the obtained third path gain G12 is above the first threshold TH1. If not, it can be deduced that the D2D radio link is not of sufficient quality for D2D communication and a conventional cellular mode of operation is used in an action 608. This action corresponds to case 1 in FIG. 7. On the other hand, if the third path gain G12 is above the first threshold TH1 in action 606, the base station further checks in an action 610 whether the second path gain G2 is above the second threshold TH2. If not, it can be deduced that the cellular radio link between the base station and the second wireless device is not of sufficient quality for enabling beneficial assistance of NWC from device D2, and a conventional cellular mode of operation is applied in an action 612. This action corresponds to case 2 in FIG. 7.

On the other hand, if the second path gain G2 is above the second threshold TH2 in action 610, the base station further checks in an action 614 whether the first path gain G1 is below the third threshold TH3. If not, it can be deduced that the cellular radio link between the base station and the first wireless device is of satisfactory quality such that no assistance of NWC is needed from device D2, and a conventional cellular mode of operation can be applied is this case as well in an action 616. This action corresponds to case 3 in FIG. 7.

The base station further checks in an action 618 whether the first path gain G1 is above the fourth threshold TH4 which is lower than the third threshold TH3. If not, it can be deduced that the cellular radio link between the base station and the first wireless device is of such low quality that the cellular mode of operation on the direct cellular link to the first wireless device would not be of any use at all, and a mode of operation only using assistance by NWC from device D2 is applied in this case in an action 620. This action corresponds to case 4 in FIG. 7. On the other hand, if the first path gain G1 is above the fourth threshold TH4 in action 618, it can be deduced that the cellular radio link between the base station and the first wireless device is of such quality that the cellular mode of operation on the direct cellular link to the first wireless device may be of some use but needs assistance by NWC, and in this case the cellular mode of operation is applied combined with assistance by NWC from device D2, in an action 622. This action corresponds to case 5 in FIG. 7. In the latter case 5, the first path gain G1 is thus above the fourth threshold TH4 but below the third threshold TH3.

In this way, the threshold condition may be evaluated in view of the first, second and third path gains G1, G2 and G12, respectively. It should be noted that it is not necessary to compare these path gains G1, G2 and G12 with the thresholds TH1-TH4 in the sequence order shown in this example, but they could rather be executed in any order depending on implementation. According to this procedure, the conventional cellular mode is applied as soon as one of the sub-conditions in actions 606, 610 and 614 is satisfied. Only when all these sub-conditions in actions 606, 610 and 614 are satisfied, the base station will instruct the second wireless device D2 to apply network coding and use the network coded form transmitted by the second wireless device D2 for decoding the data transmitted by the first wireless device D2, either alone as of action 620 or combined with the cellular mode as of action 622.

A detailed but non-limiting example of how a base station of a radio network may be structured with some possible functional entities such as modules, circuits or units, to bring about the above-described functionality of the base station, is illustrated by the block diagram in FIG. 8. In this figure, the base station 800 is arranged to support communication over a cellular radio link between the base station and a first wireless device D1. The base station 800 may be configured to operate according to any of the examples and embodiments of employing the solution as described above and as follows. In particular, the base station 800 may be arranged or configured to perform at least the actions of the flow chart in FIG. 4 in the manner described above.

The base station 800 comprises a suitable communication module 800a with radio circuitry for conducting radio communication with the wireless devices D1 and D2. The network node 600 also comprises an obtaining module 800b which is configured to:

obtain a first path gain G1 of a cellular radio link between the base station and the first wireless device D1, e.g. according to the above description of action 400, obtain a second path gain G2 of a cellular radio link between the base station and the second wireless device D2, e.g. according to the above description of action 402, and obtain a third path gain G12 of a D2D radio link between the first wireless device D1 and the second wireless device D2, e.g. according to the above description of action 404.

The base station 800 also comprises a logic module 800c which is configured to instruct the second wireless device D2 to apply network coding on first data x1 transmitted from the first wireless device D1 and further instruct the second wireless device D2 to transmit a network coded form of the first data x1, when the first, second and third path gains satisfy a threshold condition, e.g. according to the above description of actions 406-408. Examples of how the threshold condition may be defined have been described above. The communication module 800a is configured to receive a radio signal with the first data x1 transmitted from the first wireless device D1, and to use the network coded form of the first data transmitted by the second wireless device D2 for decoding the first data x1, e.g. according to any of the embodiments described above.

The base station 800 may also comprise a measuring module 800d which is configured to perform measurements of the respective cellular radio links between the base station and the first and second wireless devices D1, D2 in order to obtain one or both of the first path gain G1 and the second path gain G2. These measurements may include measurements of path loss of the respective cellular radio links.

The above base station 800 and its functional modules may be configured or arranged to operate according to various optional embodiments, e.g. one or more of the embodiments described above in connection with FIG. 4. In a possible embodiment, the logic module 800c may be configured to instruct the second wireless device D2 to apply network coding on the first data x1 transmitted from the first wireless device D1 and on second data x2 transmitted from the base station, and to transmit a network coded form of the first and second data x1, x2. The communication module 800a may then be configured to use the network coded form of the first and second data x1, x2 transmitted by the second wireless device D2 for decoding the first data x1.

In another possible embodiment, the logic module 800c may be configured to set a transmit power $P^{UE,NWC}$ of at least one of the first and second wireless devices as:

$$P^{UE,NWC} = \min[P_{MAX}, \max[A,B]]$$

where $P_{MAX}$ is a maximum allowed transmit power. A and B and various parameters therein have been defined and described above. This embodiment is thus an example, without limitation, of how the transmit power can be set for one or both of the first and second wireless devices such that the benefit of reduced transmit power to or from the devices in conjunction may be achieved together with adequate decoding of radio signals received from the first device D1 assisted by the network coded form of the data received from the second device D2.

It should be noted that FIG. 8 illustrates some possible functional modules 800a-d in the base station 800 and the skilled person is able to implement these functional modules in practice using suitable software and hardware. Thus, the solution is generally not limited to the shown structures of the base station 800, and the functional modules 800a-d may be configured to operate according to any of the features described in this disclosure, where appropriate.

Figure 4:
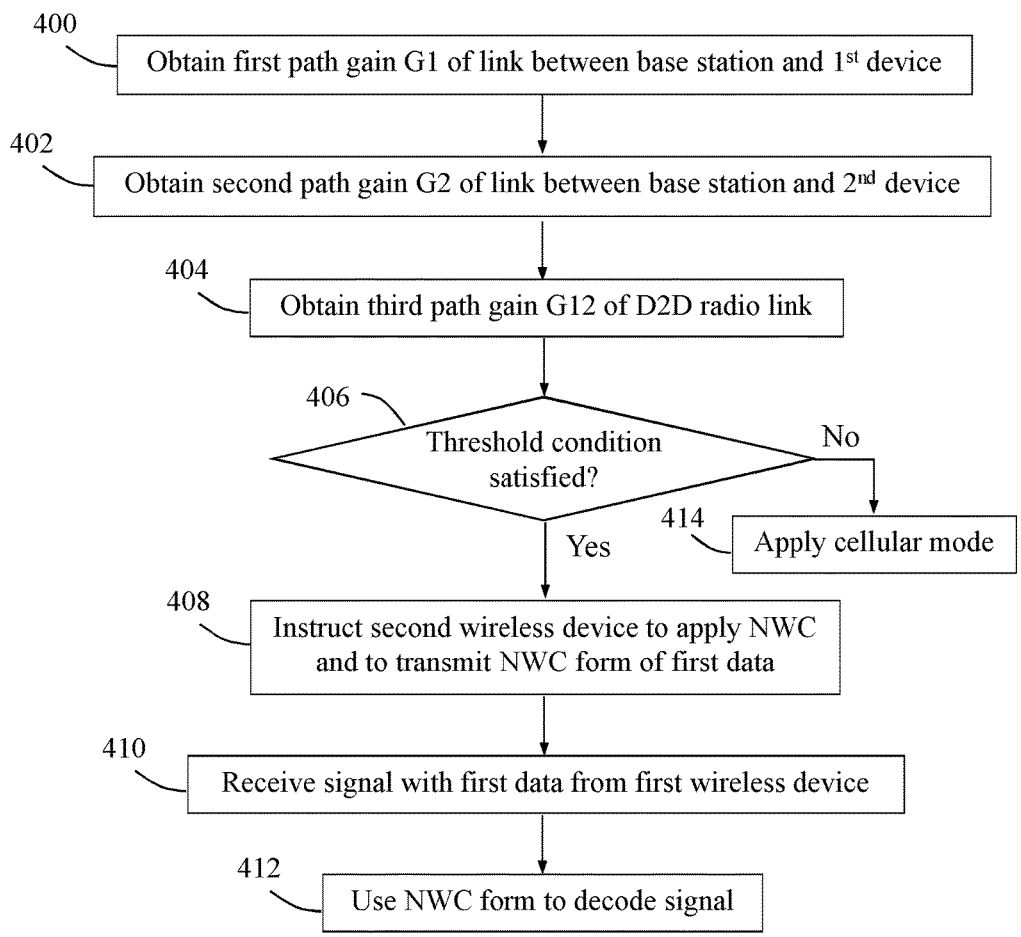
FIG. 4 is a flow chart illustrating a procedure in a base station, according to further possible embodiments.
Figure 6:
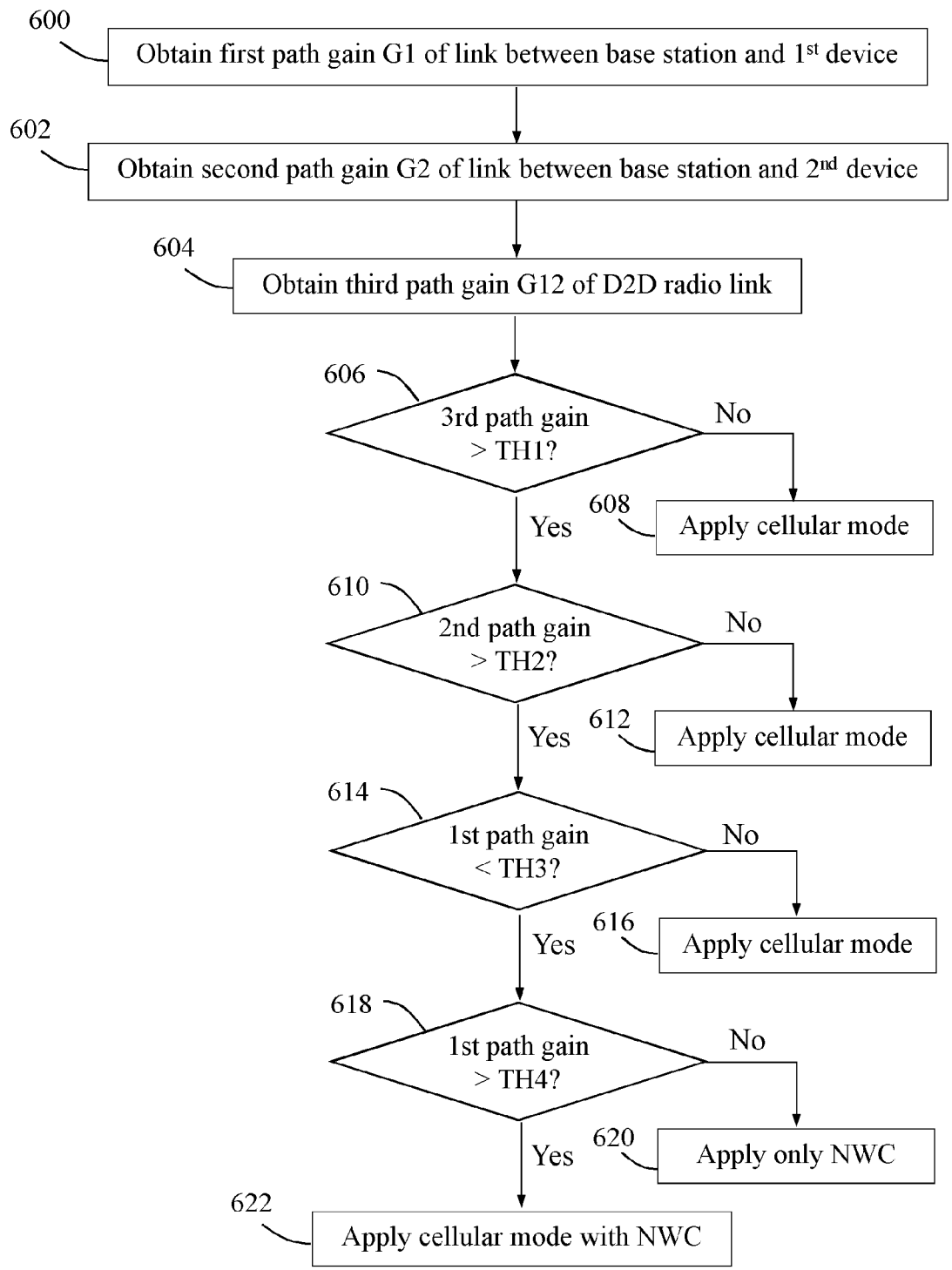
FIG. 6 is another flow chart illustrating a more detailed procedure in a base station, according to further possible embodiments.

The embodiments and features described herein may be implemented in a computer program comprising computer readable code which, when run on a base station, causes the base station to perform the above actions e.g. as described for FIGS. 4 to 6 and the appropriate functionality described for the base station 800 in FIG. 8. Further, the above-described embodiments may be implemented in a computer program product comprising a computer readable medium on which the above computer program is stored. The computer program product may be a compact disc or other carrier suitable for holding the computer program. Some examples of how the computer program and computer program product can be realized in practice are outlined below.

The functional modules 800a-d described above for FIG. 8 may be implemented in the base station 800 by means of program modules of a respective computer program comprising code means which, when run by a processor "P" causes the base station 800 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise storage for caching purposes.

Each computer program may be carried by a computer program product in the base station 800 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the base station 800.

It was mentioned above that the base station and the wireless device D1 may decode the received data x1 and x2, respectively, aided by the network coded form F(x1,x2) of the data by performing a combining operation that may be known as such. In this context, "combining" means that the receiving node produces an estimate of the data that has been transmitted by its peer node. The receiving base station or device D1 uses the data received directly from its peer node and the network coded data received from the second device D2, as well as its own transmitted data which has been saved by the base station and the device D1 as described above.

Figure 9:
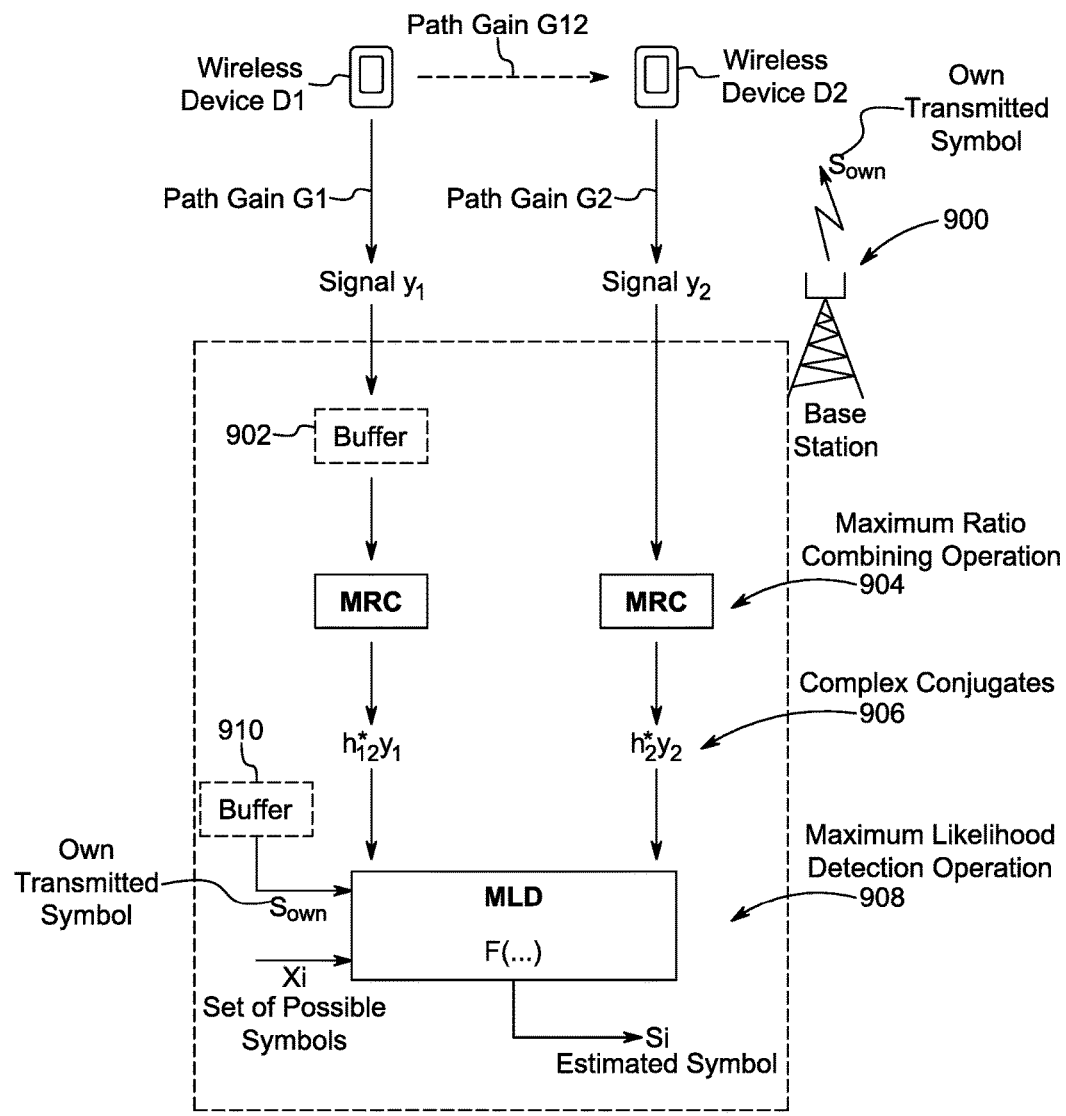
FIG. 9 is a diagram illustrating how a combining operation may be executed by a base station when the solution is employed.

An example of how such a combining operation might be executed by a base station is illustrated by FIG. 9 and reference will also be made to the example illustrated by FIGS. 2a and 2b. The base station 900 receives a signal $y_1$ from device D1 over the D2D radio link with the path gain G1 in the TDD timeslot 1. Numeral 902 indicates that the signal $y_1$ is temporarily buffered in base station 900. The base station 900 also transmits its own data which comprises a symbol denoted $S_{own}$ which base station 900 stores in a buffer 910. The base station 900 further receives a signal $y_2$ from the second wireless device D2 over the cellular link with the path gain G2 at a later point in the TDD timeslot 3.

To execute the combining operation, the base station 900 may perform Maximum Likelihood Detection, MLD, according to existing techniques. To this end, the base station 900 needs to use the specific function F(.,.) that was used by the device D2 to generate the network coded data. When performing the MLD operation, the base station 900 applies this specific function F(.,.) to the elements of a set of possible symbols Xi and its own transmitted symbol $S_{own}$, to compute F(Xi, x1), since this quantity is needed in the MLD operation. The comparison between the signal $y_1$ received from the device D1 and the elements of the set containing the possible Xi values is also part of the MLD operation, according to the known MLD technique.

Returning to FIG. 9, numeral 904 indicates that the base station 900 performs a Maximum Ratio Combining, MRC, operation on each of the signals $y_1$ and $y_2$. The output from the MRC operation is a complex conjugate $h^*_{12}y_1$ of a complex channel coefficient of the cellular link between the base station 300 and D1, and a complex conjugate $h^*_2 y_2$ of a complex channel coefficient of the cellular link between the base station 300 and D2. These two complex conjugates 906 are applied in the MLD operation 908 for different combinations of the own transmitted symbol $S_{own}$ that was stored in the buffer 910, and each of the set of possible symbols Xi. The outcome of this MLD operation 908 is an estimated symbol $S_i$ of the data x1 embedded in the signal $y_1$ received from the device D1.

By performing such a combining operation e.g. as outlined above, the base station 900 is able to decode the signal $y_1$ received from the device D1 by assistance from the signal $y_2$ from the device D2 with greater accuracy and reliability, by achieving e.g. lower Symbol Error Rate, SER and low Bit Error Rate, BER in the communication. Thereby, it is possible to reduce the transmit power at device D1 since it does not have to be as strong as when NWC is not applied. It should be noted that the operation in FIG. 9 may likewise be performed by the device D1 as well for decoding a signal sent from the base station 900.

While the solution has been described with reference to specific exemplary embodiments, the description is generally intended to illustrate the inventive concept and should not be taken as limiting the scope of the solution. For example, the terms "base station", "wireless device" and "network coding" have been used throughout this description, although any other corresponding entities, functions, and/or parameters could also be used having the features and characteristics described here. The solution is defined by the appended claims.

The invention claimed is:

1. A method performed by a base station of a radio network, for supporting communication over a cellular radio link between the base station and a first wireless device, the method comprising:
   obtaining a first path gain of the cellular radio link between the base station and the first wireless device;
   obtaining a second path gain of a cellular radio link between the base station and a second wireless device;
   obtaining a third path gain of a Device-to-Device (D2D) radio link between the first wireless device and the second wireless device;
   when the first, second, and third path gains satisfy respective predefined conditions, instructing the second wireless device to apply network coding on first data transmitted from the first wireless device and on second data transmitted from the base station, and to transmit, to the base station and the first wireless device, a network coded form of the first and second data;
   receiving a radio signal with the first data transmitted from the first wireless device; and
   using the network coded form of the first and second data, transmitted by the second wireless device, for decoding the first data,
   wherein a transmit power $P^{UE,NWC}$ of at least one of the first and second wireless devices is set as:

$$P^{UE,NWC} = \min[P_{MAX}, \max[A,B]],$$

where
   $A = P_0^{cell} - \alpha^{cell} \cdot G^{UE-BS} + 10 \cdot \log_{10} M^{cell}$,
   $B = P_0^{D2D} - \alpha^{D2D} \cdot G^{D2D} + 10 \cdot \log_{10} M^{D2D}$,
   $P_{MAX}$ is a maximum allowed transmit power,
   $P_0^{cell}$ is a base power level to control a cellular Signal to Noise Ratio (SNR),
   $\alpha^{cell}$ is a path loss compensation factor applied on the respective cellular radio link,
   $G^{UE-BS}$ is the path gain of the respective cellular radio link,
   $M^{cell}$ is a number of scheduled Physical Resource Blocks (PRBs) on the respective cellular radio link,
   $P_0^{D2D}$ is a base power level to control a D2D SNR,
   $\alpha^{D2D}$ is a path loss compensation factor applied on the D2D radio link,
   $G^{D2D}$ is the third path gain of the D2D radio link, and
   $M^{D2D}$ is a number of scheduled PRBs on the D2D radio link.

2. The method according to claim 1, wherein the respective predefined conditions comprise:
   a first predefined condition indicating that the third path gain is above a first predefined threshold;
   a second predefined condition indicating that the second path gain is above a second predefined threshold; and
   a third predefined condition indicating that the first path gain is below a third predefined threshold.

3. The method according to claim 2, wherein the base station uses one of:
   only the network coded form of the first and second data, transmitted by the second wireless device for decoding the first data when the first path gain is below a fourth predefined threshold which is lower than the third predefined threshold; and
   both the network coded form of the first and second data, transmitted by the second wireless device, and the received radio signal with the first data transmitted from the first wireless device in a combining operation for decoding the first data when the first path gain is above the fourth predefined threshold.

4. The method according to claim 1, further comprising signalling, to the second wireless device, a network coding function used for creating the network coded form of the first and second data.

5. The method according to claim 1, wherein the third path gain of the D2D radio link is obtained from measurements, of a link quality of the D2D radio link, reported by at least one of the first and second wireless devices.

6. The method according to claim 1, wherein the first path gain and the second path gain are obtained from measurements of link qualities of the respective cellular radio links between the base station and the first and second wireless devices.

7. The method according to claim 5, wherein a plurality of the measurements are path loss measurements.

8. A base station of a radio network, the base station being configured to support communication over a cellular radio link between the base station and a first wireless device, the base station comprising a communication module having radio circuitry for conducting radio communication with the first wireless device and a second wireless device, the base station further being configured to:
   obtain a first path gain of the cellular radio link between the base station and the first wireless device;
   obtain a second path gain of a cellular radio link between the base station and the second wireless device;
   obtain a third path gain of a Device-to-Device (D2D) radio link between the first wireless device and the second wireless device;
   when the first, second, and third path gains satisfy respective predefined conditions, instruct the second wireless device to apply network coding on first data transmitted from the first wireless device and on second data transmitted from the base station, and to transmit, to the base station and the first wireless device, a network coded form of the first and second data;
   receive a radio signal with the first data transmitted from the first wireless device; and
   use the network coded form of the first and second data, transmitted by the second wireless device, for decoding the first data,
   wherein a transmit power $P^{UE,NWC}$ of at least one of the first and second wireless devices is set as:

$$P^{UE,NWC} = \min[P_{MAX}, \max[A,B]],$$

where
   $A = P_0^{cell} - \alpha^{cell} \cdot G^{UE-BS} + 10 \cdot \log_{10} M^{cell}$,
   $B = P_0^{D2D} - \alpha^{D2D} \cdot G^{D2D} + 10 \cdot \log_{10} M^{D2D}$,
   $P_{MAX}$ is a maximum allowed transmit power,
   $P_0^{cell}$ is a base power level to control a cellular Signal to Noise Ratio (SNR),
   $\alpha^{cell}$ is a path loss compensation factor applied on the respective cellular radio link,
   $G^{UE-BS}$ is the path gain of the respective cellular radio link,
   $M^{cell}$ is a number of scheduled Physical Resource Blocks (PRBs) on the respective cellular radio link,
   $P_0^{D2D}$ is a base power level to control a D2D SNR,
   $\alpha^{D2D}$ is a path loss compensation factor applied on the D2D radio link,
   $G^{D2D}$ is the third path gain of the D2D radio link, and
   $M^{D2D}$ is a number of scheduled PRBs on the D2D radio link.

9. The base station according to claim 8, wherein the respective predefined conditions comprise:
   a first predefined condition indicating that the third path gain is above a first predefined threshold;

a second predefined condition indicating that the second path gain is above a second predefined threshold; and a third predefined condition indicating that the first path gain is below a third predefined threshold.

10. The base station according to claim 9, wherein the base station is further configured to use one of:

only the network coded form of the first and second data, transmitted by the second wireless device, for decoding the first data when the first path gain is below a fourth predefined threshold which is lower than the third predefined threshold; and both the network coded form of the first and second data, transmitted by the second wireless device, and the received radio signal with the first data transmitted from the first wireless device in a combining operation for decoding the first data when the first path gain is above the fourth predefined threshold.

11. The base station according to claim 8, wherein the base station is further configured to signal, to the second wireless device, a network coding function used for creating the network coded form of the first and second data.

12. The base station according to claim 8, wherein the base station is configured to obtain the third path gain of the D2D radio link from measurements, of a link quality of the D2D radio link, reported by at least one of the first and second wireless devices.

13. The base station according to claim 8, wherein the base station is configured to obtain the first path gain and the second path gain from measurements of link qualities of the respective cellular radio links between the base station and the first and second wireless devices.

14. The base station according to claim 12, wherein a plurality of the measurements are path loss measurements.

15. A computer storage medium storing computer readable code which, when run on a processor of a base station, causes the base station to perform a method for supporting communication over a cellular radio link between the base station and a first wireless device, the method comprising:

obtaining a first path gain of the cellular radio link between the base station and the first wireless device;

obtaining a second path gain of a cellular radio link between the base station and a second wireless device;

obtaining a third path gain of a Device-to-Device (D2D) radio link between the first wireless device and the second wireless device;

in response to a determination that:
the third path gain is above a first predefined threshold,
the second path gain is above a second predefined threshold, and
the first path gain is below a third predefined threshold, instructing the second wireless device to apply network coding on first data transmitted from the first wireless device and on second data transmitted from the base station, and to transmit, to the base station and the first wireless device, a network coded form of the first and second data;

receiving a radio signal with the first data transmitted from the first wireless device; and using the network coded form of the first and second data, transmitted by the second wireless device, for decoding the first data, wherein a transmit power $P^{UE,NWC}$ of at least one of the first and second wireless devices is set as:

$$P^{UE,NWC} = \min[P_{MAX}, \max[A,B]],$$

where
$A = P_0^{cell} - \alpha^{cell} \cdot G^{UE\text{-}BS} + 10 \cdot \log_{10} M^{cell}$,
$B = P_0^{D2D} - \alpha^{D2D} \cdot G^{D2D} + 10 \cdot \log_{10} M^{D2D}$,
$P_{MAX}$ is a maximum allowed transmit power,
$P_0^{cell}$ is a base power level to control a cellular Signal to Noise Ratio (SNR),
$\alpha^{cell}$ is a path loss compensation factor applied on the respective cellular radio link,
$G^{UE\text{-}BS}$ is the path gain of the respective cellular radio link,
$M^{cell}$ is a number of scheduled Physical Resource Blocks (PRBs) on the respective cellular radio link,
$P_0^{D2D}$ is a base power level to control a D2D SNR,
$\alpha^{D2D}$ is a path loss compensation factor applied on the D2D radio link,
$G^{D2D}$ is the third path gain of the D2D radio link, and
$M^{D2D}$ is a number of scheduled PRBs on the D2D radio link.

16. The computer storage medium method according to claim 15, wherein for decoding the first data, the base station uses one of:

only the network coded form of the first and second data, transmitted by the second wireless device, for decoding the first data when the first path gain is below a fourth predefined threshold which is lower than the third predefined threshold; and both the network coded form of the first and second data, transmitted by the second wireless device, and the received radio signal with the first data transmitted from the first wireless device in a combining operation for decoding the first data when the first path gain is above the fourth predefined threshold.

* * * * *